Oct. 31, 1939.  A. L. RICHE ET AL  2,178,312
SAFETY CONTROL MECHANISM FOR GAS OR LIQUID FUEL BURNERS
Filed Nov. 21, 1936  3 Sheets-Sheet 1

Inventors:
Arthur L. Riche &
John R. Hathaway
By
Oliver W. Storey  atty.

Oct. 31, 1939.  A. L. RICHE ET AL  2,178,312
SAFETY CONTROL MECHANISM FOR GAS OR LIQUID FUEL BURNERS
Filed Nov. 21, 1936  3 Sheets-Sheet 2

Inventors:
Arthur L. Riche &
John R. Hathaway
By Oliver W. Storey Atty.

Oct. 31, 1939.   A. L. RICHE ET AL   2,178,312
SAFETY CONTROL MECHANISM FOR GAS OR LIQUID FUEL BURNERS
Filed Nov. 21, 1936   3 Sheets-Sheet 3
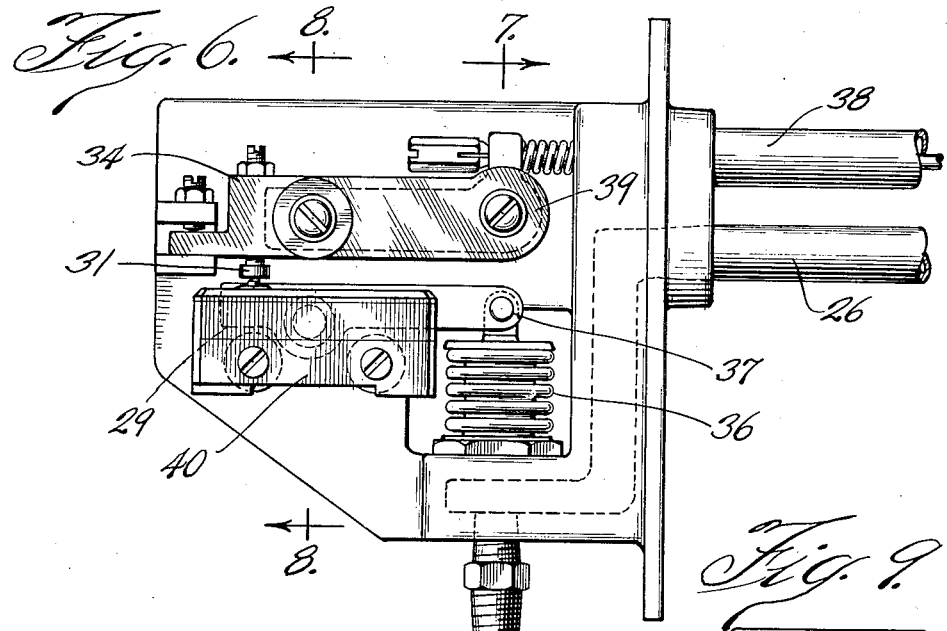
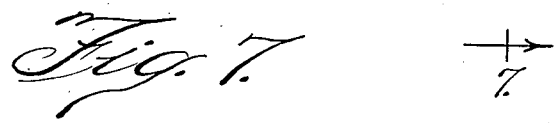
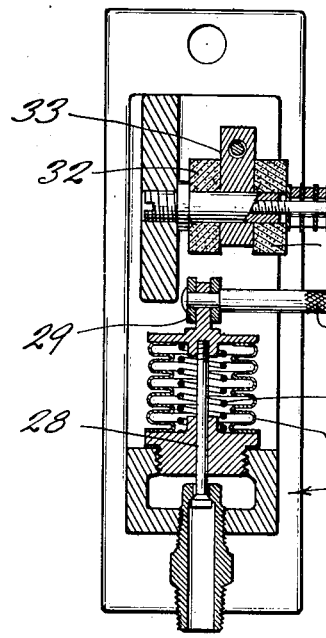
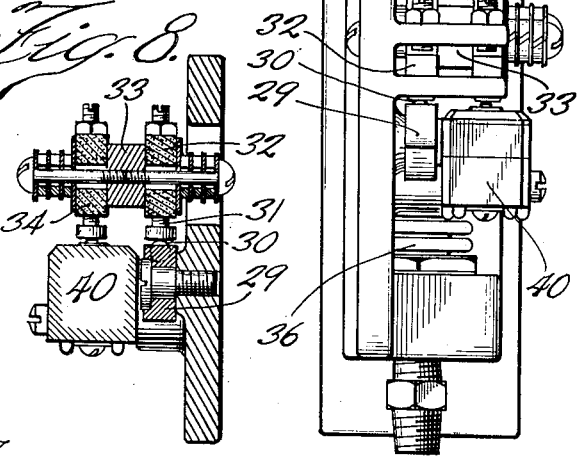
Inventors:
Arthur L. Riche &
John R. Hathaway
By Oliver W. Storey  Atty.

Patented Oct. 31, 1939

2,178,312

UNITED STATES PATENT OFFICE

2,178,312

SAFETY CONTROL MECHANISM FOR GAS OR LIQUID FUEL BURNERS

Arthur L. Riche and John R. Hathaway, Freeport, Ill., assignors, by mesne assignments, to Micro Switch Corporation, Freeport, Ill., a corporation of Illinois Application November 21, 1936, Serial No. 112,063

5 Claims. (Cl. 200—137)

This invention relates to improvements in thermostats and more particularly to thermal responsive controls operating a snap switch and adapted to be used in conjunction with a burner or other heating element to control the supply of fuel or other condition desired to be regulated with relation to temperature change.

The invention is especially suitable for use in heating units using gas or similar fuel, the device being used with the pilot burner to automatically cut off the fuel supply when the pilot light becomes extinguished, thereby preventing accumulation of unburned fuel in the vicinity of the unit and consequent danger of explosions, asphyxiation or gas poisoning of persons exposed to the escaping fuel gases.

The principal objects of the invention are to provide a mechanism designed to transmit unconfined master motion to an operating member of the control switch whose travel is limited, to provide a device employing such a mechanism in a thermal control operative upon a reversal in the trend of temperature change of predetermined magnitude which device is simple of adjustment and which may be finally adjusted at the factory, and to provide a control which is adaptable to a wide range of sensitivity.

The invention provides various new and useful features of construction and arrangement as hereinafter more fully described and particularly pointed out in the claims, reference being had to the accompanying drawings in which:

Fig. 6 is a front elevation of a control device which includes an automatically operated pilot fuel supply valve;

Fig. 7 is a detail section taken at line 7—7 of Fig. 6;

Fig. 8 is a detail section taken at line 8—8 of Fig. 6;

Fig. 9 is an end elevation of the device of Fig. 6;

The improved thermal control herein described in detail, which embodies one form of our invention and is described by way of example, consists essentially of a thermal element in the form of a tube whose length is responsive to temperature conditions to which it is exposed, motion of the free end of this thermal tube being communicated to the operating plunger of a snap switch by means of a mechanism designed to operate the switch upon the initial contraction or expansion of the thermal tube. This mechanism, which is more fully described hereinafter, consists of a bell crank having one arm connected by a suitable link to the free end of the thermal tube and a friction member super-imposed upon the other arm and bearing against it sufficiently to be driven by the bell crank but allowing rotation of the crank beyond the confines of the stops which limit the movement of the friction member. This friction member is rotatably mounted at the fulcrum of the bell crank, the free end engaging the operating plunger of the snap switch.

In operation, the temperature of the thermal tube is maintained at a constant level by the heat evolved in the combustion of fuel from a burner, which may be the pilot burner. If at any time ignition of the fuel fails, the thermal tube will cool and contract, causing the bell crank and friction member bearing against it to rotate, thus operating the switch and altering the status of an electrical circuit which closes an auxiliary supply valve. When the heater controlling thermostat, operating normally, operates to open the valve which supplies fuel to the main burner, or when the valve is opened manually, an auxiliary valve controlled by our safety device prevents the supplying of fuel to the main burners until proper ignition facilities are restored. Upon contraction of the thermal tube beyond the point at which the switch is operated, the friction member is held against further rotating by a stop while the bell crank continues to rotate, sliding by the friction member. After combustion is restored and the thermal tube begins to expand, the switch is returned to its original position upon a predetermined rise in temperature of the expanding tube since the friction member controlling it will be carried with the rotating bell crank upon initial movement thereof until it reaches the other stop.

Figure 1:
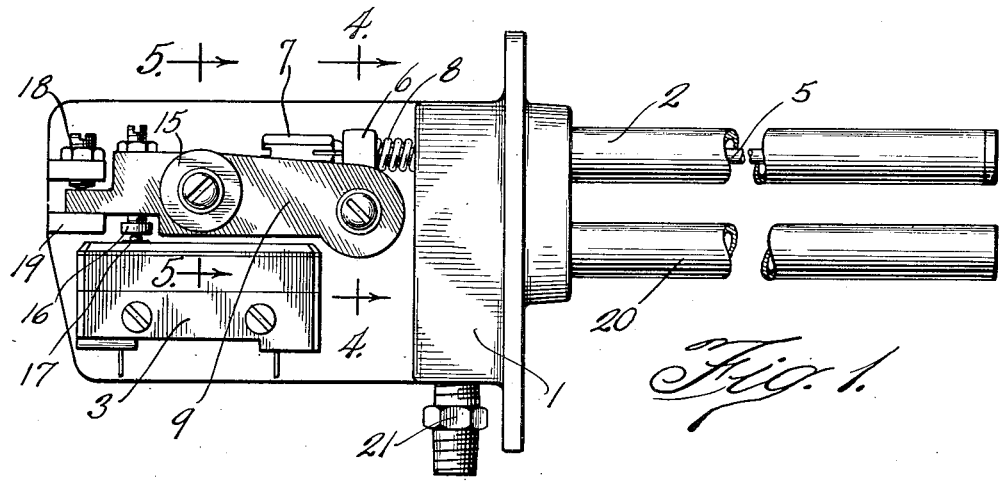
Fig. 1 is a front elevation of one embodiment of our device.
Figure 2:
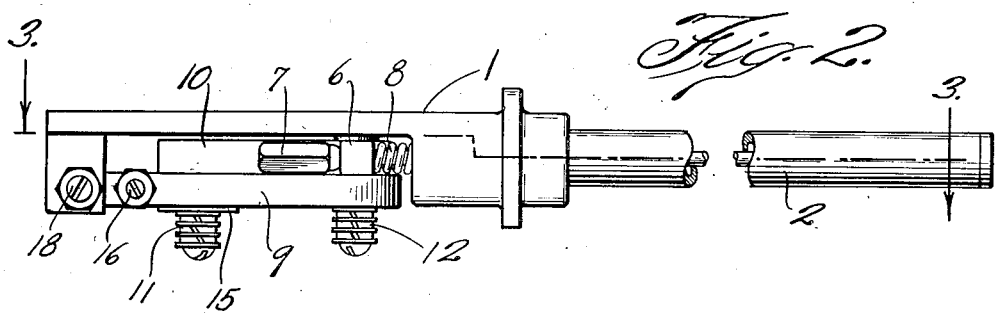
Fig. 2 is a plan view of the device of Fig. 1.
Figure 3:
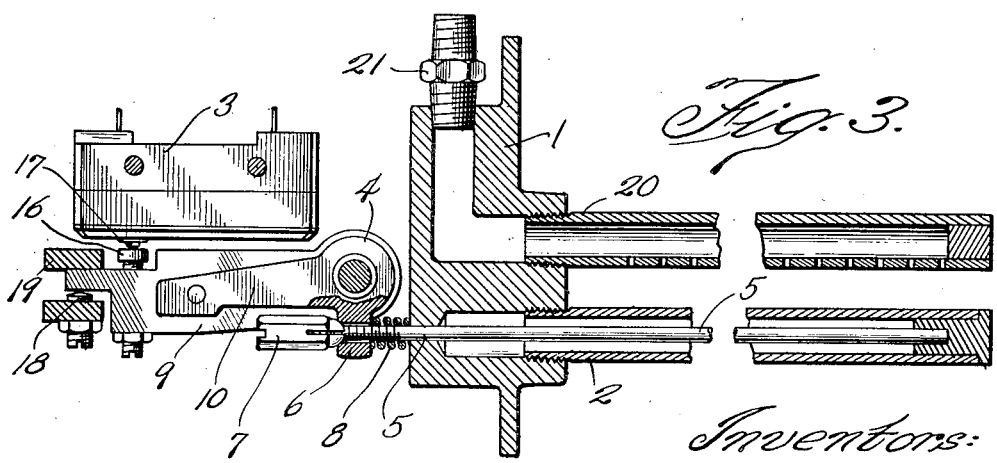
Fig. 3 is a sectional view taken at line 3—3 of Fig. 2.
Figure 4:
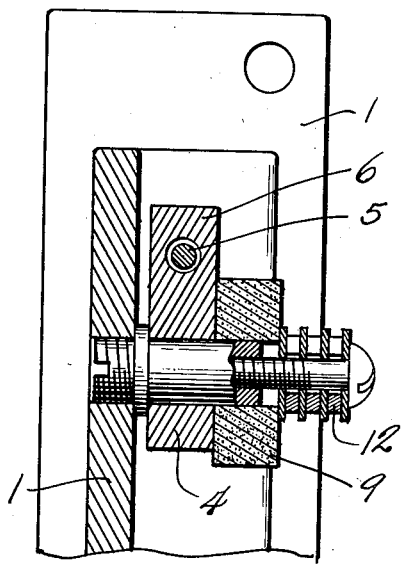
Fig. 4 is a detail section taken at line 4—4 of Fig. 1.
Figure 5:
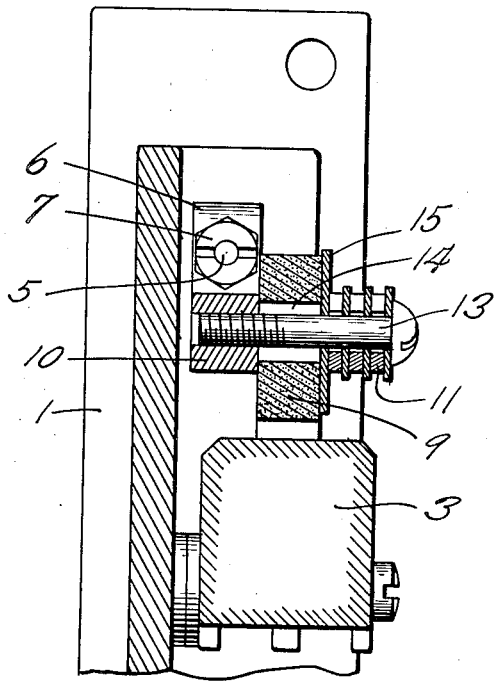
Fig. 5 is a detail section taken at line 5—5 of Fig. 1.

Referring to Figs. 1, 2 and 3, the thermal pilot safety control illustrated is shown to comprise a support 1, thermal element 2 in the form of a tube screwed into support 1, a switch 3, and the mechanism designed to actuate the switch upon certain temperature conditions in the vicinity of thermal element 2 when installed. Element 2 may be of any convenient material having a relatively high coefficient of thermal expansion, a sufficiently high melting point to withstand the temperatures to which it may be exposed, and sufficiently corrosion and oxidation resistant to be unaffected by the products of combustion of the fuel. A suitable material is a metal such as steel or ferro-nickel having a composition of 74.2% iron, 25% nickel, 0.8% carbon. Switch 3 may be any convenient circuit breaking device operable upon relatively small movement of the actuating member. The snap switch described in McGall Patent No. 1,960,020 may be used advantageously, the motion of the operating plunger of this device being about 0.001 inch.

Movement of the free end of element 2 caused by longitudinal expansion or contraction is communicated to bell crank 4 by rod 5 reciprocating within tube 2 and connected to bell crank arm 6 by means of nut 7 which may be screwed onto rod 5 any desired distance. This rod may be of any suitable material having a coefficient of thermal expansion substantially less than that of thermal element 2. Spring 8 is provided to bear against support 1 and urge crank arm 6 against nut 7 thereby maintaining a tensile stress in rod 5 and causing crank 4 to rotate as thermal member 2 contracts. Friction member 9 is rotatably mounted upon support 1 at the fulcrum of crank 4 and is urged against the surface of crank arm 10 by springs 11 and 12. These springs may be built up from an alternating series of spring lock washers and flat washers to supply the required pressure, as shown in the drawings or other spring means may be used. Spring pin 13 passes through clearance slot 14 in friction member 9 and may be screwed into crank arm 10, bearing member 15 being provided to transmit the spring pressure of spring 11 to friction member 9. Contact 16 is provided in friction member 9 to cooperate with plunger 17 of switch 3 to operate the switch. This contact is adjustable with respect to the distance of its face from the friction member 9. Stops 18 and 19 are provided to limit rotation of the friction member and thus the travel of contact 16. Stop 18 may be adjustable, as shown.

Where the device is used as a pilot safety control, pilot burner 20 is advantageously mounted upon support 1. This construction maintains thermal element 2 and burner 20 in fixed relation to each other, thereby eliminating any false operation of the mechanism caused by changing temperature conditions due to shifting of burner 20 relatively to element 2. Nipple 21 is provided to connect the burner to the fuel supply.

In the embodiment shown, crank arm 10 is longer than arm 6, the purpose of this construction being to secure a mechanical advantage operative to increase the sensitivity of the control while rendering adjustment of stop 18 less critical. Friction member 9 may be of metal or, preferably, of a non-metallic, non-hygroscopic material. A phenolic molding such as "Bakelite" is a suitable material. This member may be made wider than crank arm 10 to protect the metallic surface of the crank from corrosion.

Figure 10:
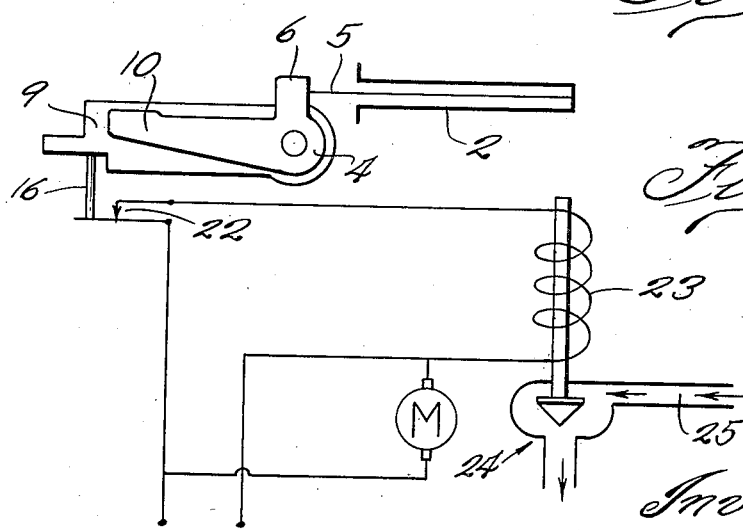
Fig. 10 shows diagrammatically the system operated by my control device.

The operating electric circuit is shown in Fig. 10. Switch 22 is shown in the normal operating closed position. Solenoid 23, being energized by current in the circuit, retains valve 24 in open position allowing fuel to pass through pipe 25. Any cooling of the thermal element 2 would result in actuating the control mechanism to open switch 22, de-energizing solenoid 23 and allowing valve 24 to close. Gas pressure tends to retain the valve in closed position. Flow of fuel to the burners is prevented until the pilot flame re-heats thermal element 2 causing a re-opening of valve 24. It should be noted that the blower motor M and the solenoid circuit are connected to a common source of power, so that if the power fails and the motor cannot operate, solenoid 23 is de-energized and valve 24 closed. Overheating of the unit resulting from failure of the blower to supply air to take up the heat formed when combustion is taking place is thus prevented.

The combination of our thermal control with a pilot cut-off valve is shown in Figs. 6, 7, 8 and 9. Fuel supplying pilot burner 26 passes through valve 27. Valve stem 28 is operably connected by means of lever 29 and ball contact 30 and adjustable pin 31 to friction member 32. This friction member abuts against bell crank arm 33 on the surface opposite to switch operating friction member 34 which corresponds to member 9 in Figs. 1, 2 and 3. A light spring 35 may be used to co-operate with the gas pressure in maintaining valve 27 in closed position after being closed by the action of the control. Bellows 36 may be used in place of the usual stem packing to keep the force required to actuate valve 27 at a minimum. Pin 37 is provided for manual operation of the valve.

Operation of the combined device is controlled by thermal member 38. Any cooling of this member causes counterclockwise rotation of bell crank 39, friction member 34 being carried with the crank causes switch 40 to open the operating circuit thereby closing the burner supply valve, friction member 32 mechanically closing pilot burner valve 27. This valve may be opened manually by means of pin 37 and the pilot burner re-lighted. Normal operation of the heating unit is thereupon resumed.

Divers other arrangements are possible in the adaptation of the control to a combined thermal control and mechanical cut-off. For example, the switch operating friction member 9 may be extended and the valve stem operably connected with the end of the extension. A resilient connection may be used to allow overtravel in either direction.

The particular form of thermal control herein described and illustrated will be seen to be of a construction which is readily adaptable to a large number of installations. Physical distortion of the working parts of the mechanism due to stretching or wear has no effect upon its action. Any desired sensitivity and working differential may be obtained by a proper selection of materials used in the thermal element and in the connecting rod within the thermal element, and by adjustment of the stop limiting friction member rotation. A thermal element of high sensitivity may be constructed from a material having a high coefficient of thermal expansion, the rod connecting the free end of the thermal element with the crank being of a material having a low or negative coefficient of expansion. Other materials and combinations may be used to obtain desired characteristics.

It will be apparent to those skilled in the art that our invention provides a simple means for communicating the master movement of the controlling member of an automatic control mechanism to a snap switch, the mechanism being designed to communicate only sufficient motion to operate the switch and allow the controlling member full latitude of motion without external confinement. The invention is not intended to be limited to the specific embodiment described and illustrated, this employment being adopted only for purposes of example in the present disclosure. For example, any form of lever may be used in place of the bell crank herein shown and described, and the arrangement of the various parts of the mechanism may be altered without departing from the essentials of the invention. It may be otherwise modified and adapted in many ways within the scope of the appended claims.

We claim:

1. In a thermal control mechanism, in combination, a support, a thermally actuated control tube fixedly mounted at one end to said support, a bell crank rotatably mounted at its fulcrum, a link connecting one arm of said crank to the free end of said tube, a friction member rotatably mounted at said fulcrum of said crank and in frictional contact with the free arm thereof, means urging said friction member against said free crank arm, and a switching mechanism so mounted with respect to said friction member that it is operable upon relatively small rotation of said friction member.

2. In a thermal controlling mechanism, a support, a longitudinally actuated control tube having a relatively high coefficient of thermal expansion rigidly mounted upon said support, a bell crank rotatably mounted at its fulcrum upon said support, a wire or rod composed of a material having a relatively low coefficient of thermal expansion positioned within said tube and having one end fixed to the free end thereof and the other end attached to one arm of said bell crank, first spring means for maintaining tension in said wire or rod, a friction member rotatably mounted at said fulcrum of said crank and in frictional contact with the free arm thereof, second spring means urging said friction member against said free crank arm, and a plunger operated switch of small plunger travel, the tension of said second spring means being correlated with the force required to operate said switch whereby to permit operation of said switch by said bell crank and to permit continued rotation of said bell crank independently of said friction member after operation of said switch.

3. The mechanism of claim 2 and including longitudinally adjustable means upon the wire or rod comprising screw threads upon said rod and a nut bearing against the bell crank arm.

4. The mechanism of claim 2 and including adjustable stop means upon the support comprising a set screw bearing against the free end of the friction member to limit rotation thereof.

5. The mechanism of claim 2, wherein said first spring means acts upon said bell crank, and through said bell crank upon said wire or rod, the force exerted by said first spring means being sufficient to drive said bell crank to operate said switch.

JOHN R. HATHAWAY.
ARTHUR L. RICHE.